(12) United States Patent
Câmara Leal De Oliveira Tognato (10) Patent No.: US 11,134,654 B2
(45) Date of Patent: Oct. 5, 2021

(54) ARRANGEMENT APPLIED TO FEED DOSING DISPENSER

(71) Applicant: Felipe Câmara Leal De Oliveira Tognato, São Paulo (BR)

(72) Inventor: Felipe Câmara Leal De Oliveira Tognato, São Paulo (BR)

( * ) Notice: Subject to any disclaimer, the term of this patent is extended or adjusted under 35 U.S.C. 154(b) by 346 days.

(21) Appl. No.: 16/312,087

(22) PCT Filed: Jun. 27, 2017

(86) PCT No.: PCT/BR2017/050164
§ 371 (c)(1),
(2) Date: Dec. 20, 2018

(87) PCT Pub. No.: WO2018/000065
PCT Pub. Date: Jan. 4, 2018

(65) Prior Publication Data
US 2019/0230900 A1 Aug. 1, 2019

(30) Foreign Application Priority Data
Jun. 30, 2016 (BR) .......................... 2020160154206

(51) Int. Cl.
*A01K 5/02* (2006.01)
(52) U.S. Cl.
CPC .............. *A01K 5/0291* (2013.01); *A01K 5/02* (2013.01); *A01K 5/0225* (2013.01); *A01K 5/0275* (2013.01)
(58) Field of Classification Search
CPC .. A01K 5/0291; A01K 5/0225; A01K 5/0275; A01K 5/02; A01K 5/0233; A01K 7/02
See application file for complete search history.

(56) References Cited

U.S. PATENT DOCUMENTS

| | | | |
|---|---|---|---|
| 3,416,497 A | 12/1968 | Riel | |
| 4,733,634 A * | 3/1988 | Hooser | A01K 7/02 |
| | | | 119/51.12 |

(Continued)

FOREIGN PATENT DOCUMENTS

| | | |
|---|---|---|
| CA | 673806 | 11/1963 |
| FR | 2336875 | 7/1977 |

(Continued)

OTHER PUBLICATIONS

International Search Report dated Aug. 1, 2017 in corresponding International Application No. PCT/BR2017/050164.

(Continued)

*Primary Examiner* — Trinh T Nguyen
(74) *Attorney, Agent, or Firm* — B. Aaron Schulman, Esq.; Stites & Harbison, PLLC (57) ABSTRACT

The present abstract refers to an utility model patent application for a dosing dispenser (1), belonging to the field of equipments for dosing and timing the dispensing of animal feed, comprising: a cabinet (2) with compartment (3) that houses the hopper (6) whose outlet (7) opens to a compartment (4) with a vertical outlet pipe (10) and that houses a batch dosing dispenser (20) comprising: a dosing chamber (21); movable carriage (24) whose top wall (25) and bottom wall (26) slide on walls (8) and (9) and between these is mounted the dosing chamber (21) whose upper inlet (22) and lower outlet (23) remain against the walls (8) and (9) and the wall (25) constitutes the closing drawer (28) of the lower outlet (7); the dosing device (20) also comprises a drive mechanism (30) that moves the carriage (24) between the position in which the inlet (22) aligns with the lower outlet (7) of the hopper (6) and the outlet (23) is closed against the bottom wall (9) and position in which the outlet (Continued)

(23) aligns with the outlet pipe (10) and the drawer (28) closes the outlet (7) of the hopper (6).

1 Claim, 7 Drawing Sheets

(56) References Cited

U.S. PATENT DOCUMENTS

| | | | |
|---|---|---|---|
| 5,284,109 A | 2/1994 | Jeng | |
| 5,299,529 A * | 4/1994 | Ramirez | A01K 5/0291 |
| | | | 119/51.11 |
| 5,433,171 A * | 7/1995 | Ewell | A01K 5/0291 |
| | | | 119/51.5 |
| 6,145,472 A * | 11/2000 | Vittuari | A01K 5/0291 |
| | | | 119/51.02 |
| 7,051,675 B1 | 5/2006 | Mayer et al. | |
| 7,100,299 B2 | 9/2006 | Jensen et al. | |
| 7,228,816 B2 * | 6/2007 | Turner | A01K 5/0114 |
| | | | 119/51.02 |
| 9,000,069 B1 | 4/2015 | Mackulin et al. | |
| 9,414,568 B2 * | 8/2016 | Veness | A01K 5/0275 |
| 10,721,914 B2 * | 7/2020 | Silverman | A01K 7/02 |
| 2003/0145796 A1 * | 8/2003 | Rasmussen | A01K 5/0225 |
| | | | 119/53.5 |
| 2015/0181838 A1 * | 7/2015 | Epema | G01L 1/16 |
| | | | 119/52.1 |
| 2017/0354119 A1 * | 12/2017 | Dewey | A01K 13/003 |

FOREIGN PATENT DOCUMENTS

| | | |
|---|---|---|
| MU | 7100299 U | 10/1992 |
| MU | 8900560 U2 | 12/2010 |
| MU | 9000069-2 U2 | 8/2011 |
| MU | 9000069-2 U8 | 8/2011 |

OTHER PUBLICATIONS

Written Opinion dated Aug. 9, 2017 in corresponding International Application No. PCT/BR2017/050164.

* cited by examiner

ARRANGEMENT APPLIED TO FEED DOSING DISPENSER

INTRODUCTION

This descriptive report refers to a utility model patent application for a feed dosing dispenser, belonging to the field of equipments used for dosing and releasing food to animals at pre-adjusted times, which received an advantageous arrangement, particularly in its dosing and dispensing device, to constitute a batch dosing dispenser.

STATE OF THE ART

Dosers of the type that refers to the present patent application normally consist of, essentially: a silos that contains a load with various doses of feed; a dosing device, in which the silos outlet opens and doses the amount of feed to be supplied; a computer device through which the intervals and amounts of feed to be released are programmed; an activating mechanism of the doser whose activation is programmed through the computer; and others.

The documents MU 8900566-0, MU 7100299 and MU 9000069-2 refer to dosing devices. In these and in other dosers, the dosing and release of feed occurs through the dosing chamber equipped with an worm thread, in which the silos outlet opens and the amount of food during every release operation is based on the size of the dosing chamber, the worm thread, and especially its pitch, speed and time of operation, among others. Depending on the parameters, especially the dimensions of the dosing chamber assembly, the operation of the worm thread may be relatively long during each supply of feed.

Yet, in this type of equipment, the dispensing occurs progressively in the feed trough as the worm thread turns. This may be undesirable, depending on the type of animal that is being fed and/or its "temper".

Another inconvenience in this type of doser consists of the fact that, not rarely, due to an eventual damage in the equipment, the worm thread may function uninterruptedly for long periods, causing the dispensing of large amounts of food, even the entire amount in the silos, food that ends up being eaten by the animal, which is undesirable, especially when there is the interest of supplying a controlled amount of food. Furthermore, when the feed is combined with a drug, this situation may compromise the health of the animal.

This eventual malfunction of the equipment is even more serious when the equipment operates independently, i.e., turns on, doses and dispenses the food, turns off and returns to waiting mode on its own, without requiring an operator. Therefore, in a situation where it is damaged, the supply of food may occur in amounts significantly higher than that specified until it empties the silos, followed by a period of no food supply, which is a situation that may continue for a long period of time due to the lack of an operator, thus negatively affecting the animal.

OBJECTIVES OF THE INVENTION

The objective of the present utility model patent is to provide a food doser that solves the aforementioned inconveniences and others observed in conventional dosers.

Another objective is to provide a construction and manufacturing doser that is simple in relation to others.

Another objective is to provide a doser with low purchase, use and maintenance cost.

SUMMARY OF THE INVENTION

Therefore, considering the problems mentioned above, observed with conventional dosing dispensers and with the aim of overcoming them and complying with the objectives listed above, a arrangement was developed applied in a feed dosing and dispensing device, object of the present patent, which substantially comprises: an upper hopper with lower outlet located in the middle of the equipment; a feed dispensing pipe dephased from the hopper outlet; a dosing device essentially comprising: a vertical, tubular, movable dosing chamber with upper inlet and lower outlet; a closing drawer of the hopper outlet, mounted laterally to the dosing chamber inlet; a lower surface against which the lower outlet of the dosing chamber slides and remains closed and at one end where the inlet of the outlet pipe opens; a computer device to program the doser; and a movement mechanism of the dosing chamber and closing drawer between one position in which the chamber aligns itself with the hopper outlet and a dose of feed is loaded into the chamber by gravity and the lower outlet of the chamber remains closed by the lower sliding surface and a position in which the outlet of the full chamber is aligned with the outlet pipe and the dose of feed is suddenly dispensed by gravity, in other words, a batch is dispensed into a trough or similar structure, where the feed remains available to the animal and the drawer beside the inlet of the chamber closes the hopper outlet.

This construction and operation configures a feed batch dosing dispenser, different from normal worm thread dosers that dose and dispense feed progressively.

On the other hand, in this dosing device construction, a dose of feed is measured through the simple drop of the feed by gravity into the dosing chamber and the dose is dispensed by a movement of the chamber filled to the outlet pipe, through which the dose of feed is suddenly dispensed by gravity, i.e., dispensed by batch, into a trough or similar structure where the animal eats, thus not requiring the continuous operation of a worm thread feed doser and driver, during the entire dosing and dispensing period, such as it occurs in other constructions and the inconveniences generated by these constructions. In fact, with the present construction, in case of any damage in the equipment, for example, in the return of the dosing chamber, only one dose of feed is dispensed, without the dispensing of feed and/or drug above specification and the problems generated by this, as mentioned above.

The present doser, in addition to the advantages above, has a relatively simple construction and manufacture, thereby meeting another objective of the arrangement.

The present doser has low purchasing, operating and storage costs according to other objectives of the arrangement.

LIST OF DRAWINGS

The drawings attached refer to the arrangement applied to a feed dosing dispenser, object of the present patent, in which.

DETAILED DESCRIPTION BASED ON THE FIGURES

Figure 1:
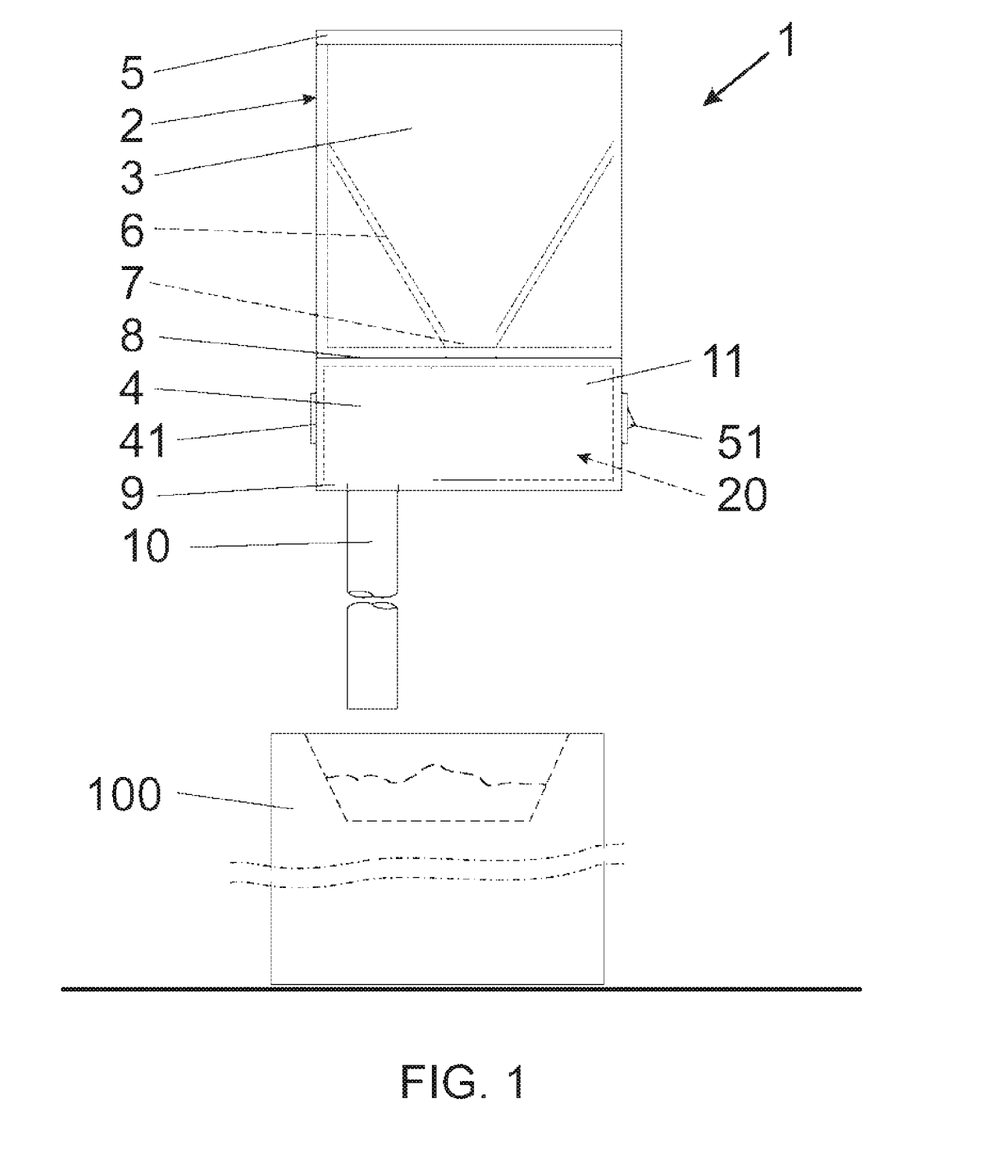
FIGS. 1 and 2 show the external, front and side views of the dosing dispenser and the indication that it is arranged over an animal feed trough.
Figure 2:
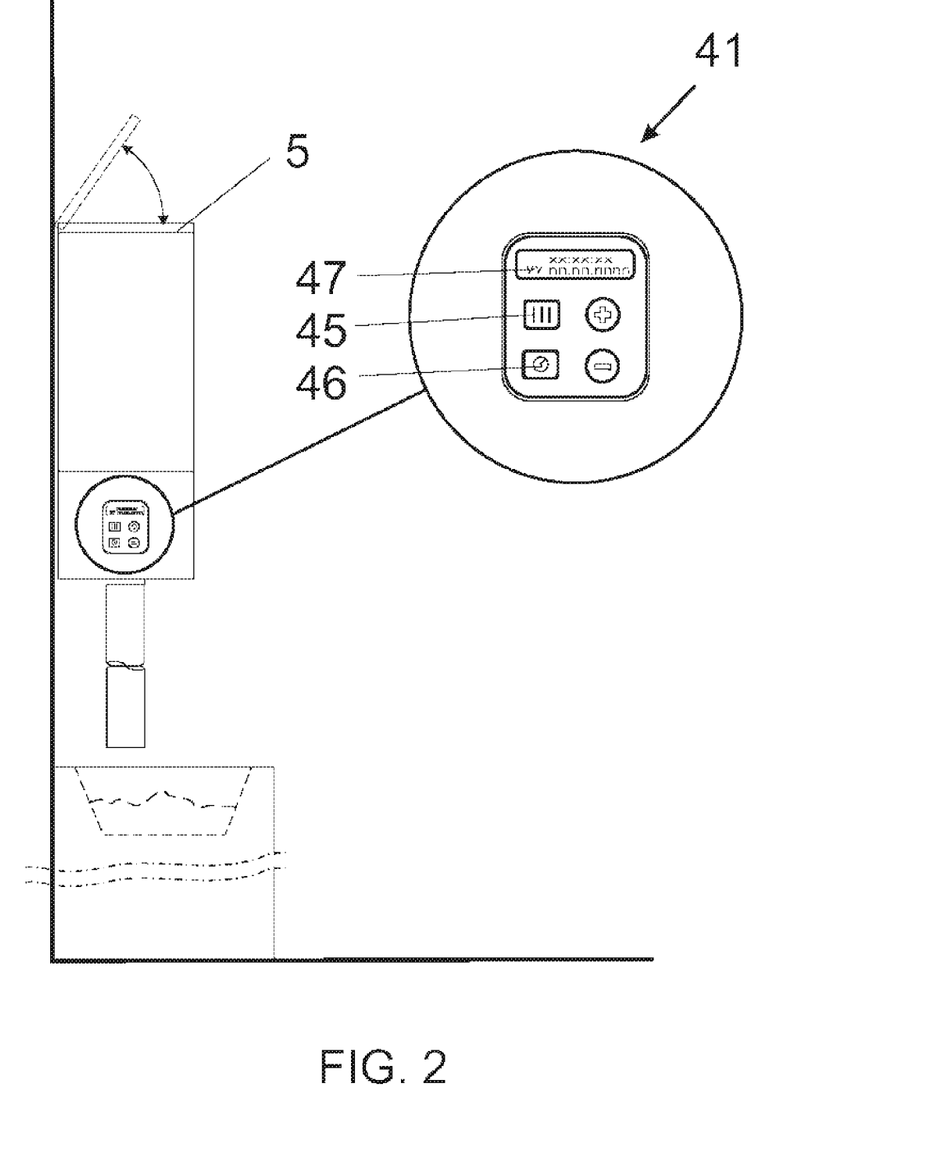

As illustrated in the figures listed above, the feed dosing dispenser 1, object of the present patent, is intended for dosing and dispensing animal feed and is used over a trough or similar structure 100, from where the animal feeds, preferably a large animal, such as: horses, cattle (FIGS. 1, 2).

The dosing dispenser 1 essentially comprises: a cabinet 2 suspended over a trough 100 equipped with top compartment 3 and smaller bottom compartment 4, which has an upper opening with cover 5 intended for the insertion of feed; said top compartment 3 houses the hopper 6, big enough to contain various doses of ration and whose lower outlet 7 is located in the middle of the wall 8, which separates the top compartment 3 and bottom compartment 4 and which opens into the latter. The left end of the lower wall 9 of the bottom compartment 4 is equipped with a vertical outlet pipe 10 dephased from outlet 7 of the hopper 6; said bottom compartment 4 houses a batch-dosing dispenser 20 and is closed by a removable front cover 11.

Figure 3:
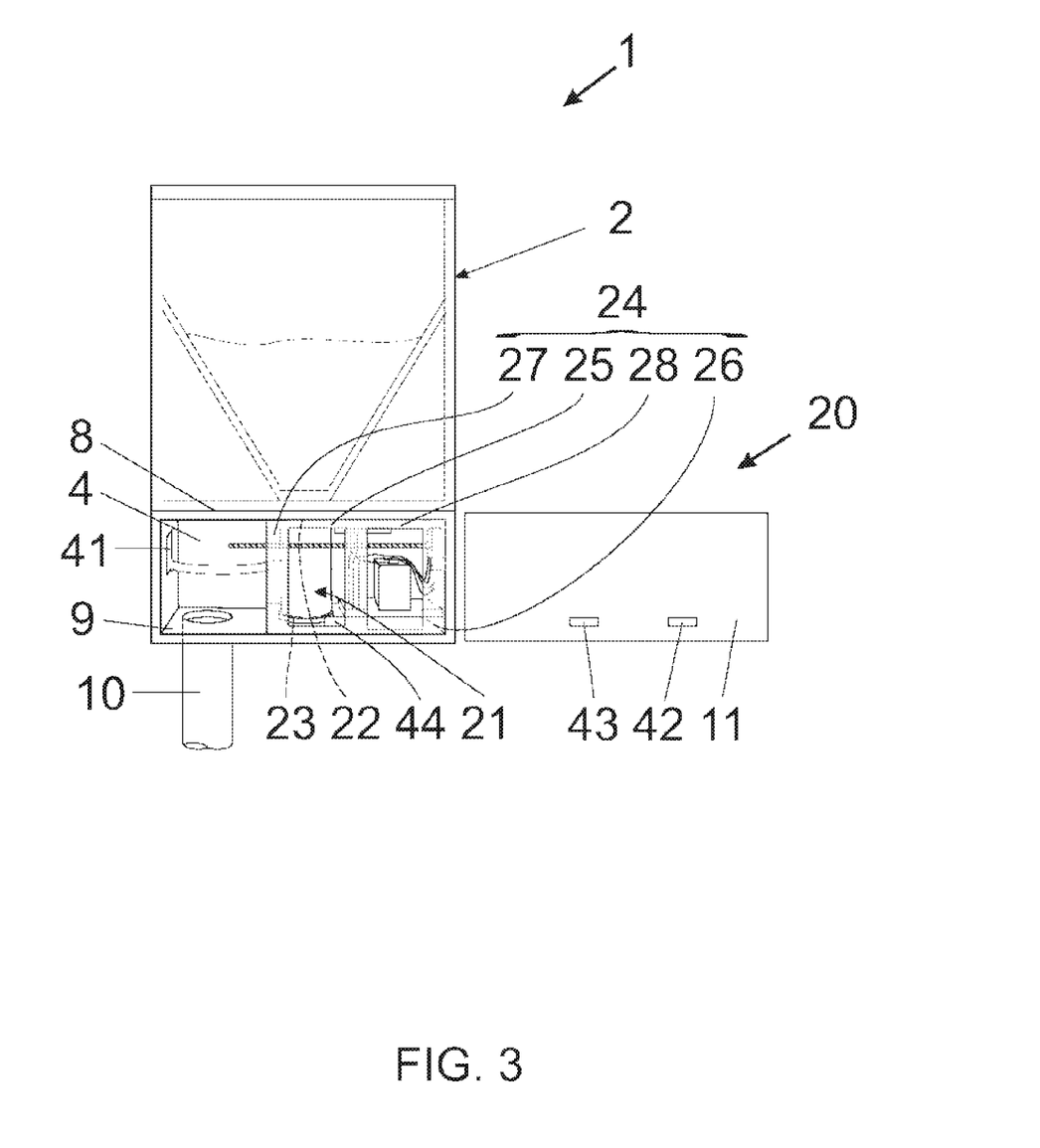
FIG. 3 shows the front view of the dosing dispenser with the highlighted compartment cover of the dosing device and seen from the inner side with the dosing device in the position where it receives the feed from the hopper.
Figure 4:
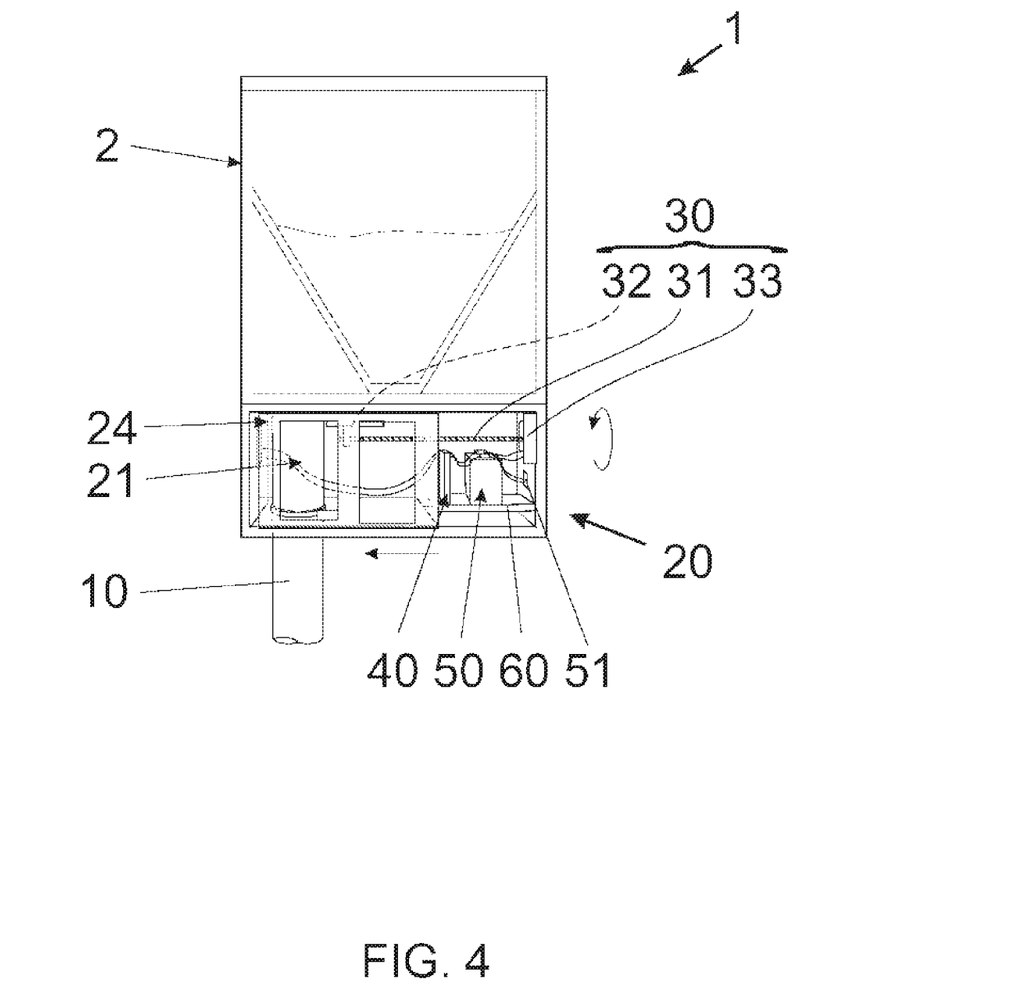
FIG. 4 shows a view similar to the previous one, but with the dosing dispenser in the position where it releases the feed into the trough.

The batch dosing dispenser 20 consists of (FIGS. 3, 4): a tubular, vertical dosing chamber 21 equipped with an upper inlet 22 and a lower outlet 23; a movable carriage 24 made up of top wall 25 and bottom wall 26 and by an intermediate wall 27 that connects them; said upper wall 25 and lower wall 26 are juxtaposed and slide on walls 8 and 9 and between these is located the dosing chamber 21 whose upper inlet 22 and lower outlet 23 remain against wall 8 that divides compartments 3, 4 and the bottom wall 9 of compartment 4, respectively, and the right region of the top wall 25 of the movable carriage 24 consists of a closing drawer 28 of the lower outlet 7 of the hopper 6, during the discharge of one dose of feed.

The batch dosing dispenser 20 is also equipped with a drive mechanism 30 consisting of: a horizontal worm thread 31 with free left end; a screw 32 mounted on the lower side of the top wall 25 of the movable carriage 24 and which has a screwed thread worm 31; and by an electric engine and transmission set 33, mounted on the right wall of the cabinet 2 and on which the opposite end of the worm thread 31 is mounted.

The batch dosing dispenser 20 has a computer device 40 for programming and activating the doser, mounted on the support base 60 mounted on the right side wall of the cabinet 2 and connected to peripherals, comprising: a user interface programming panel 41 (FIG. 2), mounted on the left wall of the cabinet 2; a sensing device (FIG. 3) of the movement of the movable carriage 24, comprising a fixed limit sensor 42 and a central sensor 43, mounted on the inner side of the removable cover 11 of compartment 4 and a movable sensor 44 mounted on the movable carriage 24 and that interacts with the others. The programming panel 41 has keys 45 to program the quantity of feed to be released in a release operation; key 46 to program the periodicity of feed release, at intervals of hours during period of days; a display 47 to show the programming records.

Said batch dosing dispenser 20 also comprises an electric circuit that consists of: an electric battery 50 that supplies the power circuit of the electric engine 33 and the source of computer device 40 mounted on the base 60; an on-off switch 51 mounted on the right wall of the cabinet 2; a electric conductor (not illustrated) to connect to a source of electric power (power grid).

Figure 7A:
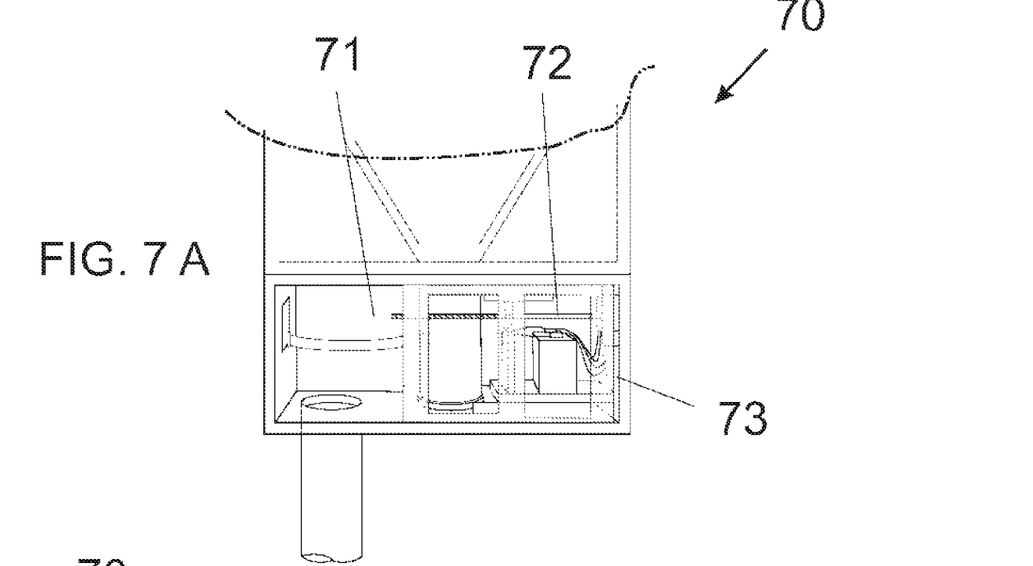
FIGS. 7A and 7B show a safety device of the equipment.
Figure 7B:
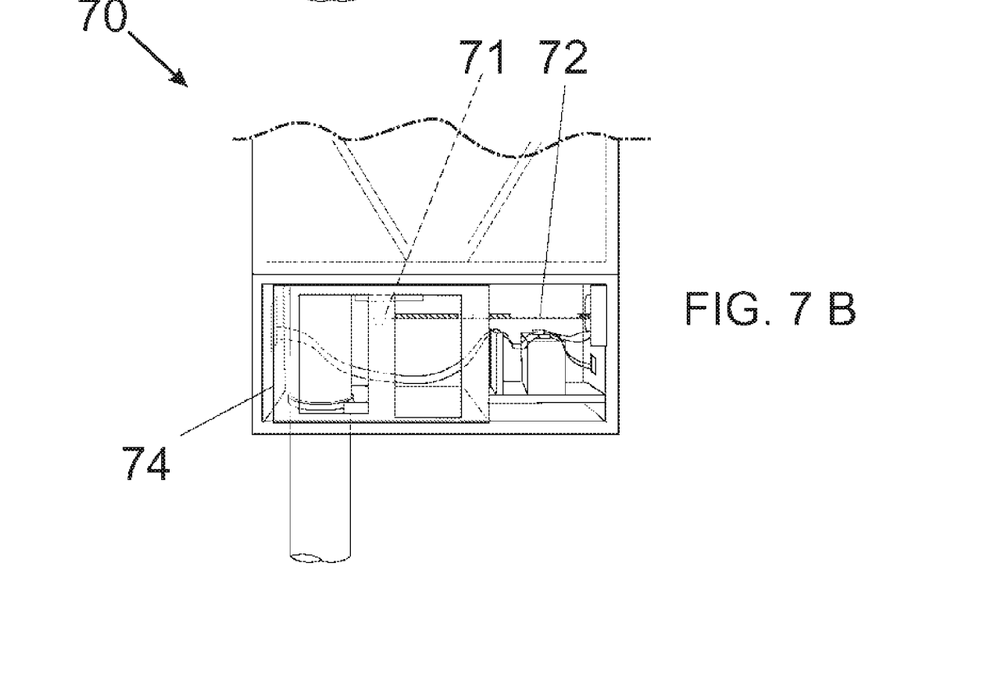

The equipment also has a safety device 70 comprising (FIGS. 7A and 7B): one smooth free end 71 of the worm thread 31 positioned in correspondence to the limit position in which the dosing chamber 21 is aligned to the outlet pipe 10 and a smooth end 72 opposite said worm thread 31, on the engine 33, positioned in correspondence with the limit position where the dosing chamber 21 is aligned to the outlet 7 of the hopper 6; in an eventual failure of the equipment, in which the worm thread 31 continues to turn continuously, said smooth ends 71 and 72 are intended to disengage and freely turn (false turn) the said worm thread 31 in the nut 32, causing the carriage 24 that houses the dosing chamber 21 to stop; said safety device 70 also consists of the fact that, in the limit position of the carriage 24, in which the dosing chamber 21 aligns with the outlet 7 of the hopper 6 (FIG. 7A) and inlet of the outlet pipe 10 (FIG. 7B), there are excess spaces 73 and 74 between said carriage 24 and the side walls of the cabinet 2, so that the threaded section of the worm thread 31 can disengage and dismount in relation to the nut 32 of the carriage 24, in case of an eventual failure in the equipment, causing it to stop without hitting and being forced against the side wall of the cabinet 2.

Therefore, when in use, initially the hopper 6 is loaded through the top opening 5 with a sufficient load of feed 200 for several doses 201 of feed. The equipment is activated on the on-off button 51 and the amount of feed per release operation and periodicity are programmed on the panel 41.

Figure 5:
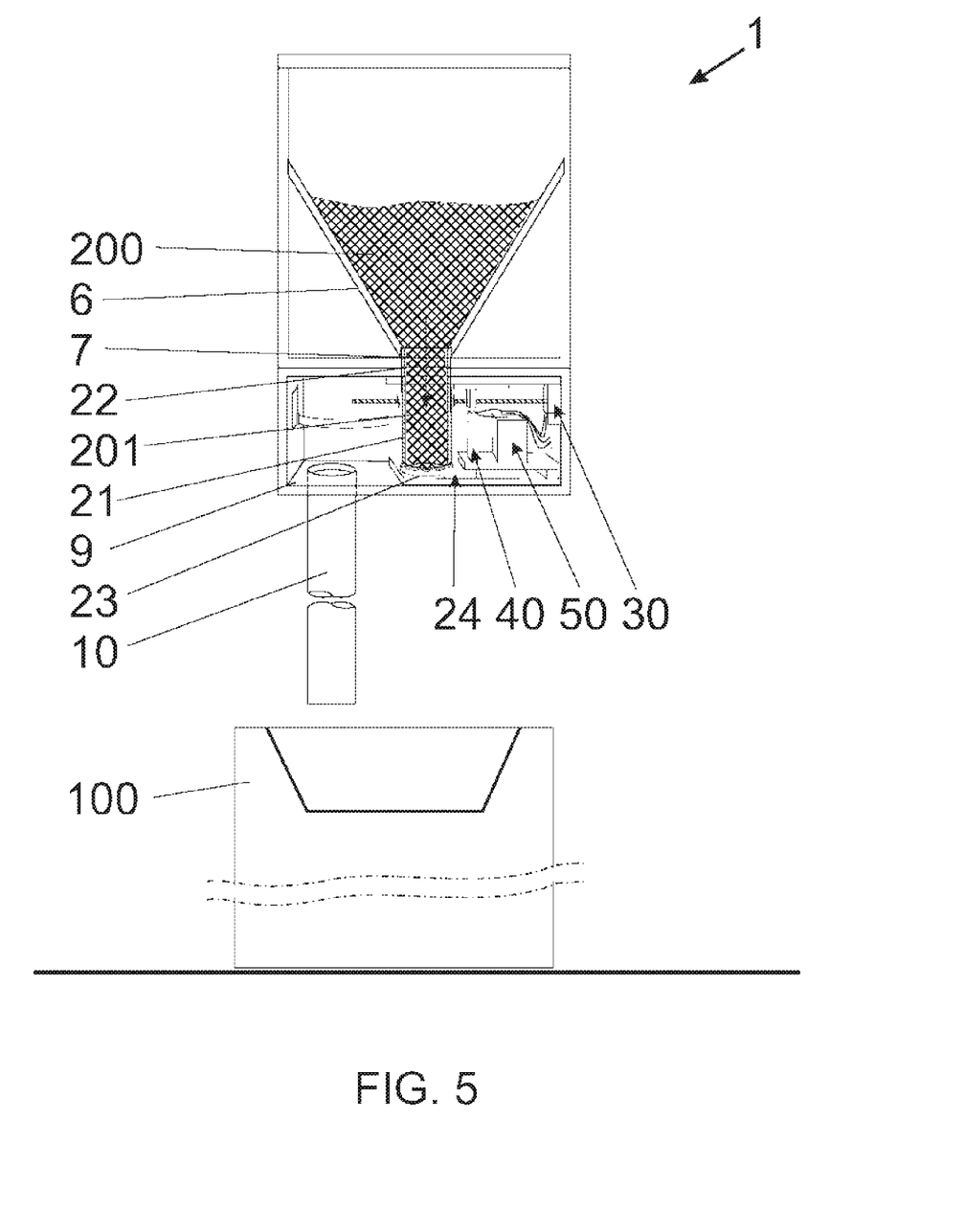
FIGS. 5 and 6 show views similar to figures three and four, but with partial sections and the indication of how the dosing dispenser works.

In the initial position, (FIG. 5) the movable carriage 24 remains stationary and keeps the dosing chamber 21 in the position in which its upper inlet 22 is aligned with the lower outlet 7 of the hopper 6 and the lower outlet 23 of said dosing chamber 21 remains closed against the bottom wall 9, and a dose of feed 201 falls by gravity and fills up the dosing chamber 21.

Figure 6:
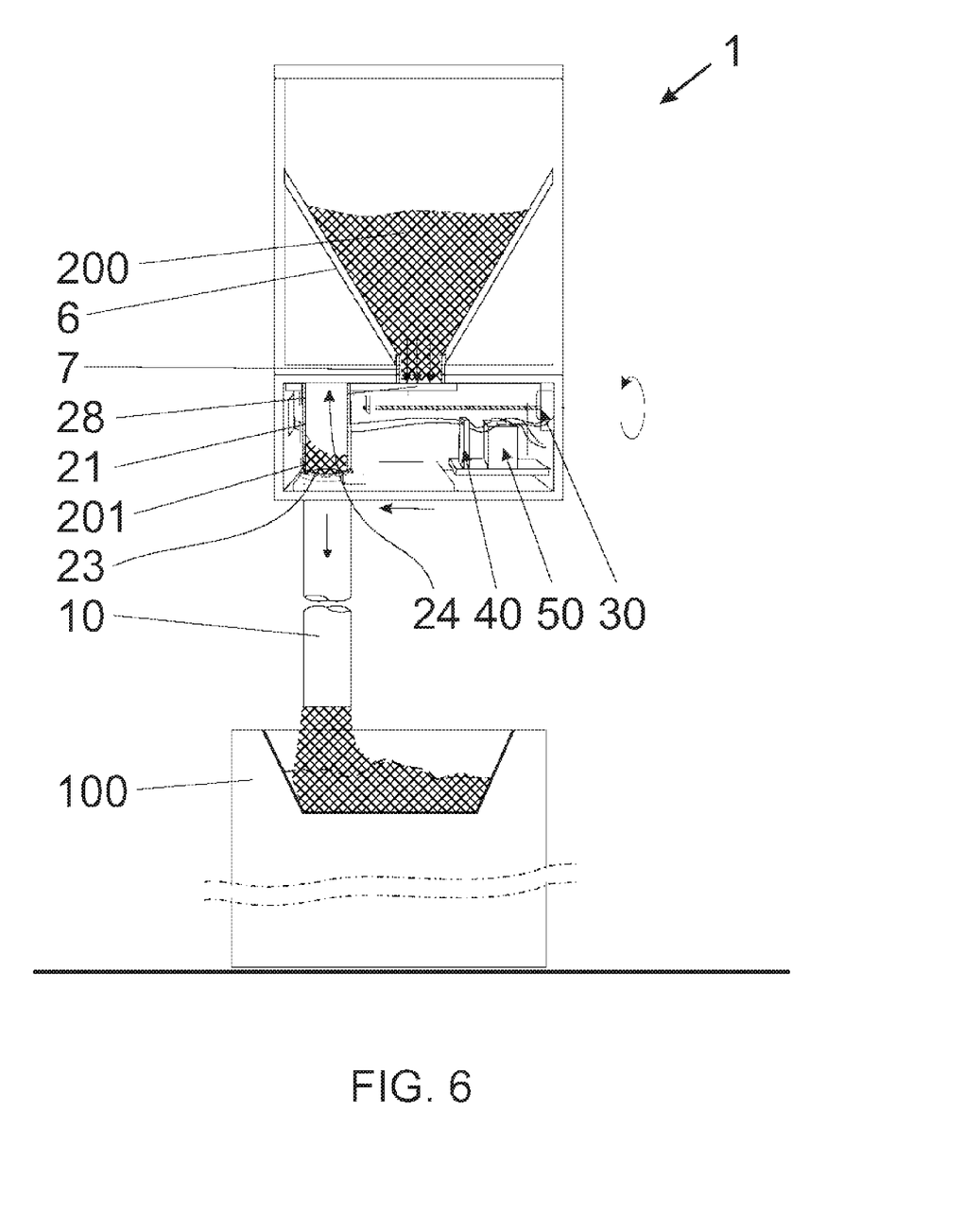

From here, the pre-set time is counted by the computer 40 and, when reached, an activation signal is generated for the engine 33 to start turning the worm thread 31 in the nut 32 of the movable carriage 24, making this and the full chamber 21 mounted on it to be displaced to the left (FIG. 6), until the sensor 44 of the carriage 24 interacts with the fixed central sensor 43 located in the centermost region of the cover 11 of the compartment 4; the engine 33 is switched off and the movement is interrupted. In this moment, the lower outlet 23 of the dosing chamber 21 is aligned with the inlet of the outlet pipe 10 and the dose of feed 201, by gravity, is feed by batch into the trough 100 and, simultaneously, the closing drawer 28, consisting of part of the top wall 25 of the movable carriage 24 to the right of the dosing chamber 21 closes the outlet 7 of the hopper 6, preventing the feed from continuing to flow. After the time counted by the computer 40, sufficient enough for the entire dose of feed 201 to flow out of the dosing chamber 21 under the force of gravity, the engine 33 is switched off by the computer 40 and the movable carriage 24 is displaced in the opposite direction until its sensor 44 interacts with the other fixed side sensor 42, generating a signal that switches off the engine 33, which is when the dosing chamber 21 re-aligns itself with the outlet 7 of the hopper 6, perform another operating cycle.

When necessary, the doser can be programmed to perform one, two or more movements during each feed release operation, and the time intervals between the release operations can have different lengths, according to the programming and the quantity of feed to be transferred to the trough.

The material dispensed b the doser may be feed, drug or others normally administered to animals.

Through the construction and operation of the dosing dispenser, after this is filled and programmed by a user, it operates alone without the need of assistance.

Inside the basic construction, described above, the dosing dispenser 1, object of the present patent, may have modifications in relation to materials, dimensions, constructive details and/or functional and/or ornamental configuration, without diverging from the scope of the protection required.

The invention claimed is:

1. A feed dosing dispenser, comprising:
    a cabinet suspended over a trough, the cabinet comprising
        a top compartment, a bottom compartment that is smaller than the top compartment, and an upper opening with a cover for inserting feed, the top compartment further comprising:
            a top hopper configured to contain several doses of the feed;
            a top wall that separates the top compartment and the bottom compartment, and opens into the bottom compartment; and
            a lower outlet located in a middle of the top wall,
        the bottom compartment further comprising:
            a bottom wall;
            a vertical outlet pipe located on a left end of the bottom wall, ending over the trough, wherein the vertical outlet pipe does not align with the lower outlet of the hopper;
            a batch dosing dispenser located at the lower outlet of the hopper; and
            a removable front cover,
        the batch dosing dispenser further comprising:
            a movable carriage comprising an upper wall, a lower wall and an intermediate wall that connects the upper wall and the lower wall, wherein the upper wall and the lower wall are juxtaposed and slide along the top wall and the bottom wall;
            a vertical tubular chamber comprising an upper inlet and a lower outlet and mounted between the upper wall and the lower wall, wherein the upper inlet is located against the top wall, the lower outlet is located against the bottom wall, and a region of the upper wall of the movable carriage located to the right of the upper inlet of the vertical tubular chamber comprises a closing drawer of the lower outlet of the hopper;
            a drive mechanism comprising a horizontal worm thread with a free left end, a nut mounted on the upper wall of the movable carriage and to which the worm thread is attached, and an electric engine and transmission assembly mounted on a right wall of the cabinet and on which an opposite end of the worm thread is mounted, wherein the drive mechanism moves the movable carriage between a first position in which the upper inlet aligns with the lower outlet of the top hopper such that a dose of the feed fills the vertical tubular chamber by gravity, the lower outlet remaining closed against the bottom wall, and a second position in which the lower outlet aligns with the vertical outlet pipe and the dose of the feed falls into the trough by gravity, the closing drawer closing the lower outlet of the top hopper;
            a computer device comprising a programming panel configured to program a quantity of the feed to be released and times at which the feed is to be released into the trough through the vertical outlet pipe, a movement sensing device to detect movement of the movable carriage, comprising a fixed limit sensor and a central sensor mounted on an inner side of the removable front cover and a movable sensor mounted on the movable carriage that interacts with the fixed limit sensor and the central sensor;
        an electric circuit comprising a battery for supplying a power circuit of the electric engine and the computer device, an on-off switch, and an electric conductor connected to an electric power grid; and
        a safety device against eventual breakdown comprising a smooth free end of the horizontal worm thread positioned in correspondence with the second position, and a smooth end opposite the horizontal worm thread on the electric engine, positioned in correspondence with the first position, wherein in both the first position and the second position, there is an excess space between the movable carriage and one of the side walls of the cabinet so as to avoid dispensing the entire reservoir to an animal.

* * * * *